US007984309B2

(12) United States Patent
Yamazaki et al.

(10) Patent No.: US 7,984,309 B2
(45) Date of Patent: Jul. 19, 2011

(54) POWER SUPPLY SYSTEM AND MANAGEMENT SYSTEM

(75) Inventors: Yukio Yamazaki, Kanagawa (JP); Taketoshi Yamaguchi, Kanagawa (JP); Kouichi Azuma, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 950 days.

(21) Appl. No.: 11/907,386

(22) Filed: Oct. 11, 2007

(65) Prior Publication Data

US 2008/0244288 A1      Oct. 2, 2008

(30) Foreign Application Priority Data

Mar. 27, 2007   (JP) ................................. 2007-080734

(51) Int. Cl.
*G06F 1/26* (2006.01)
(52) U.S. Cl. ........................................ 713/300; 713/340
(58) Field of Classification Search .................. 713/300, 713/340
See application file for complete search history.

(56) References Cited

U.S. PATENT DOCUMENTS

| | | | | |
|---|---|---|---|---|
| 5,938,770 A * | 8/1999 | Kim | ............................. | 713/300 |
| 6,810,481 B1 * | 10/2004 | Kawade et al. | ................ | 713/300 |
| 7,024,567 B2 * | 4/2006 | Kim et al. | ...................... | 713/300 |
| 7,155,622 B2 * | 12/2006 | Mancey et al. | ................ | 713/324 |
| 7,203,849 B2 * | 4/2007 | Dove | ............................. | 713/300 |
| 7,340,620 B2 * | 3/2008 | Dove | ............................. | 713/300 |
| 7,647,516 B2 * | 1/2010 | Ranganathan et al. | ........ | 713/320 |
| 2006/0117195 A1 * | 6/2006 | Niwa et al. | ..................... | 713/300 |
| 2006/0149978 A1 * | 7/2006 | Randall et al. | ................ | 713/300 |

FOREIGN PATENT DOCUMENTS

JP     A 2002-142385     5/2002

* cited by examiner

*Primary Examiner* — Chun Cao
(74) *Attorney, Agent, or Firm* — Oliff & Berridge, PLC

(57) ABSTRACT

A power supply system includes: a first device that commands an external device to perform processing, and is configured to supply electric power to the external device; a second device that is connected to the first device through a communications line, and that performs the processing in accordance with the command received from the first device; and a request unit that requests the first device to supply to the second device an amount of electric power needed for the second device performing the processing commanded by the first device, the first device determining whether or not to supply electric power to the second device, in accordance with at least one of; (i) content of the command sent to the second device, and (ii) the amount of electric power requested by the request unit and an amount of electric power which the first device is capable of supplying.

10 Claims, 13 Drawing Sheets

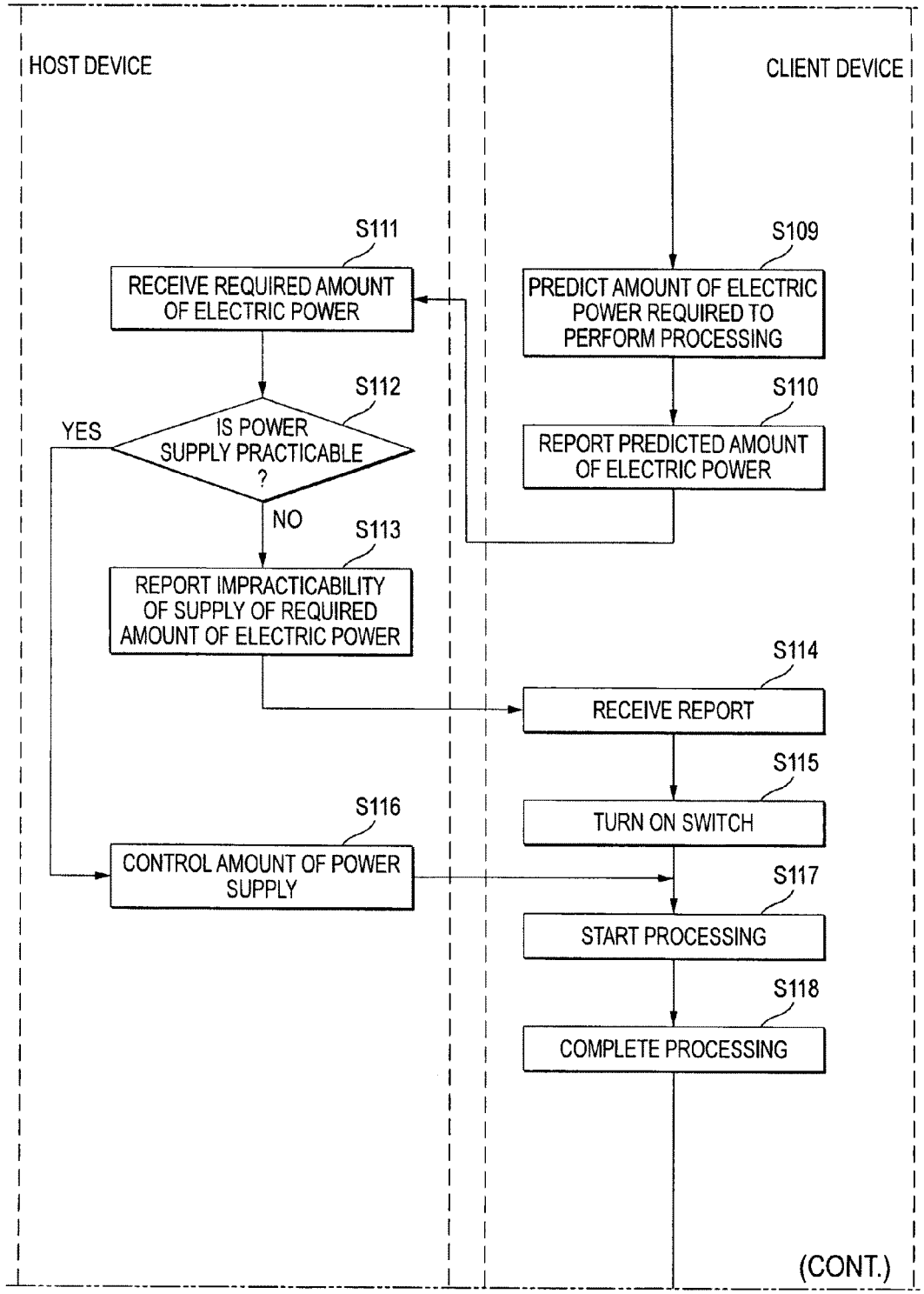

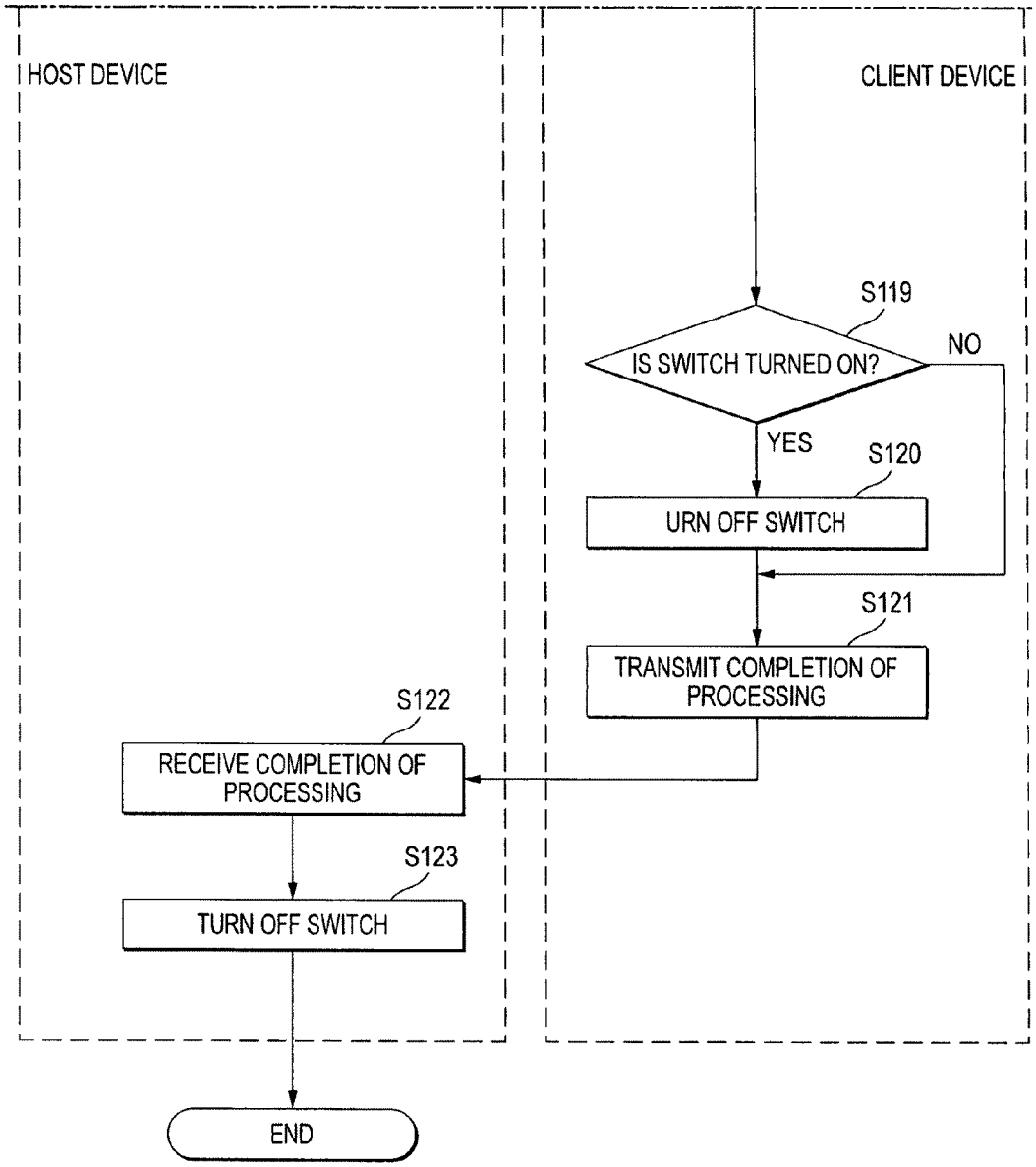

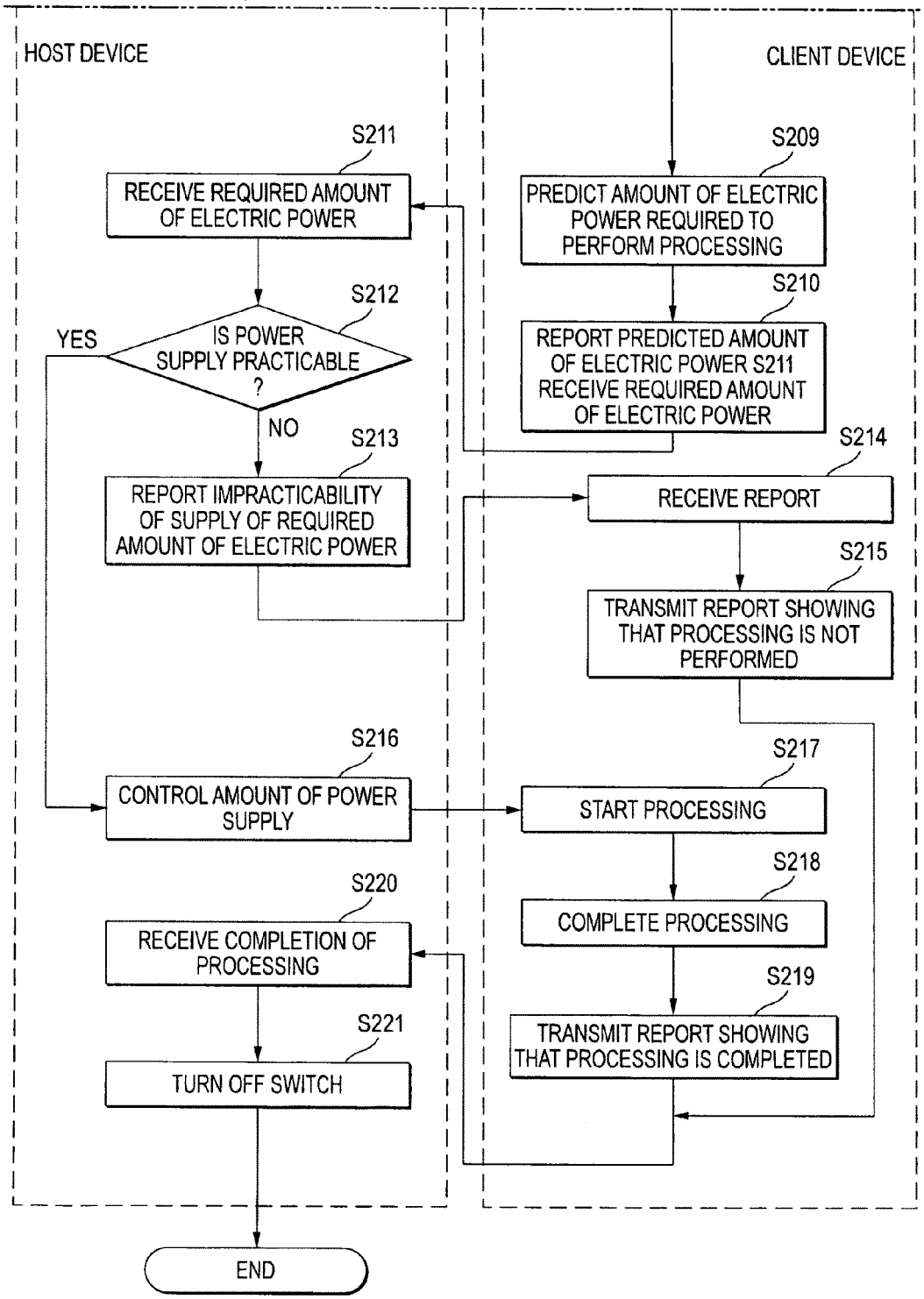

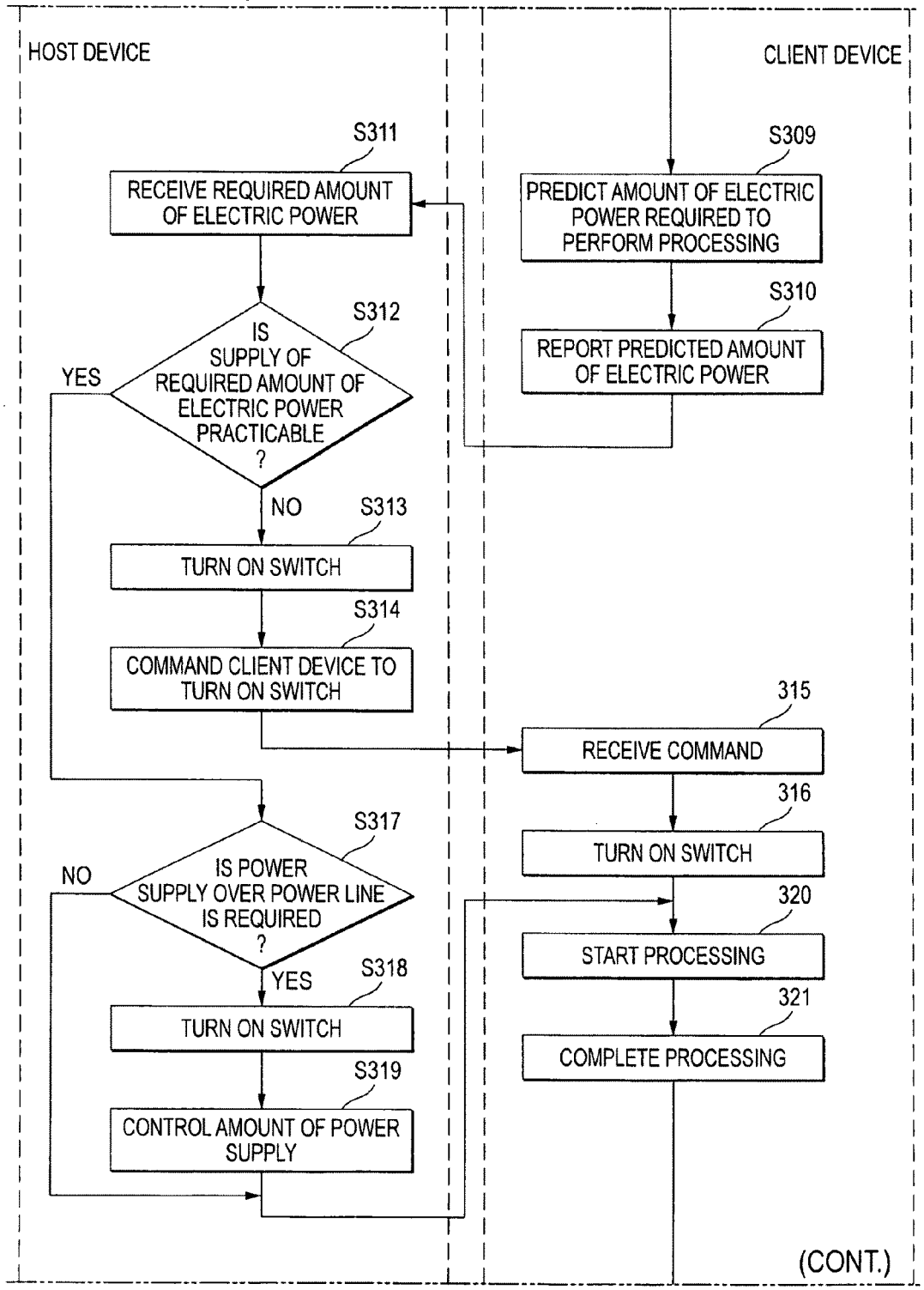

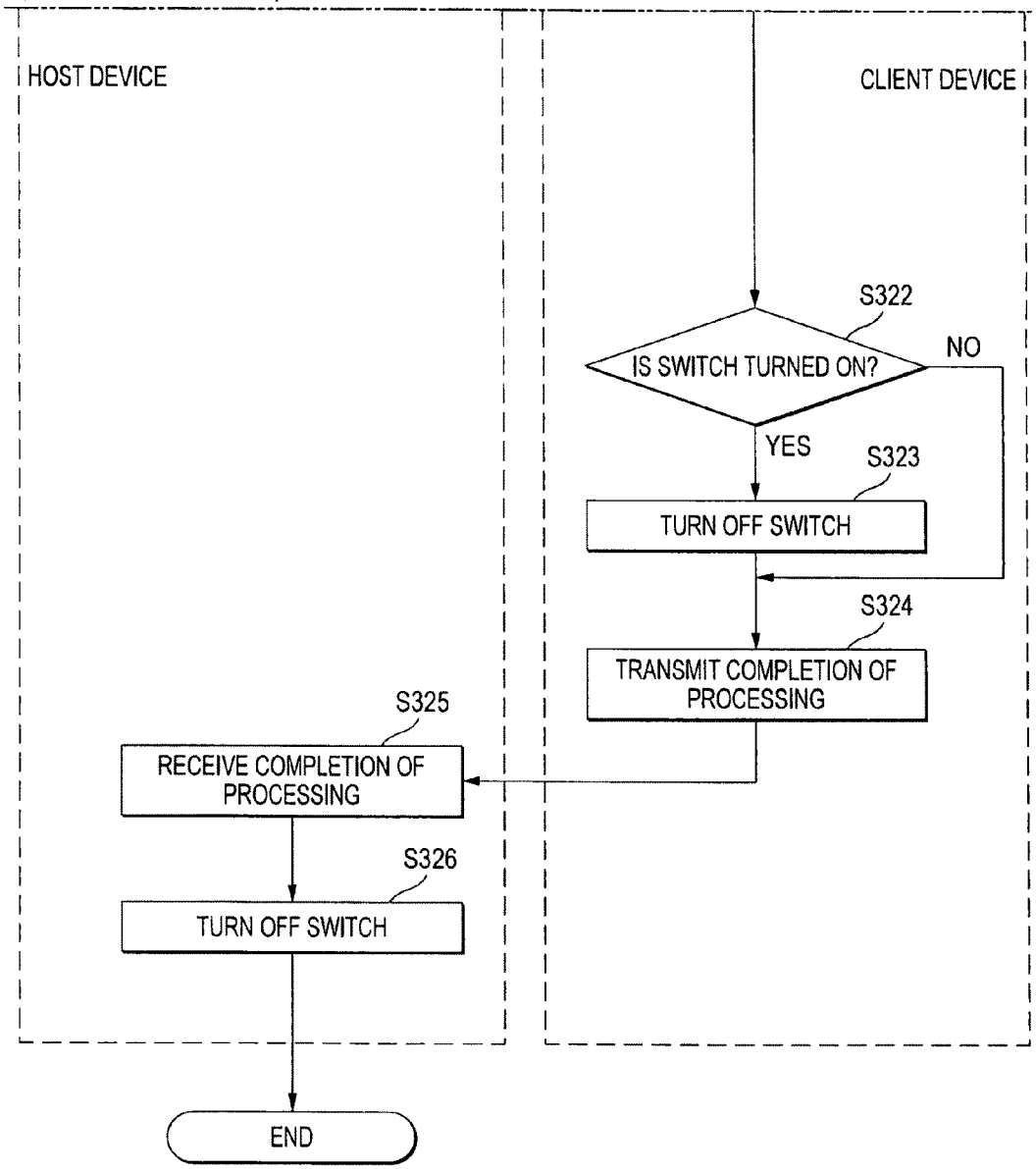

POWER SUPPLY SYSTEM AND MANAGEMENT SYSTEM

CROSS-REFERENCE TO RELATED APPLICATIONS

This application is based on and claims priority under 35 U.S.C. 119 from Japanese Patent Application No. 2007-080734 filed Mar. 27, 2007.

BACKGROUND

1. Technical Field

The present invention relates to a power supply system, a management system, and a computer readable medium.

2. Related Art

Techniques capable of implementing stable operation of an overall system by means of managing the amount of power consumed by equipment connected to a network have hitherto been proposed.

SUMMARY

According to an aspect of the present invention, a power supply system includes: a first device that commands an external device to perform processing, and is configured to supply electric power to the external device; a second device that is connected to the first device through a communications line, and that performs the processing in accordance with the command received from the first device; and a request unit that requests the first device to supply to the second device an amount of electric power needed for the second device performing the processing commanded by the first device, the first device determining whether or not to supply electric power to the second device, in accordance with at least one of; (i) content of the command sent to the second device, and (ii) the amount of electric power requested by the request unit and an amount of electric power which the first device is capable of supplying.

BRIEF DESCRIPTION OF THE DRAWINGS

Exemplary embodiment of the present invention will be described in detail based on the following figures, wherein.

DETAILED DESCRIPTION

Embodiments of the present invention will be described hereunder in detail by reference to the accompanying drawings.

Figure 1:
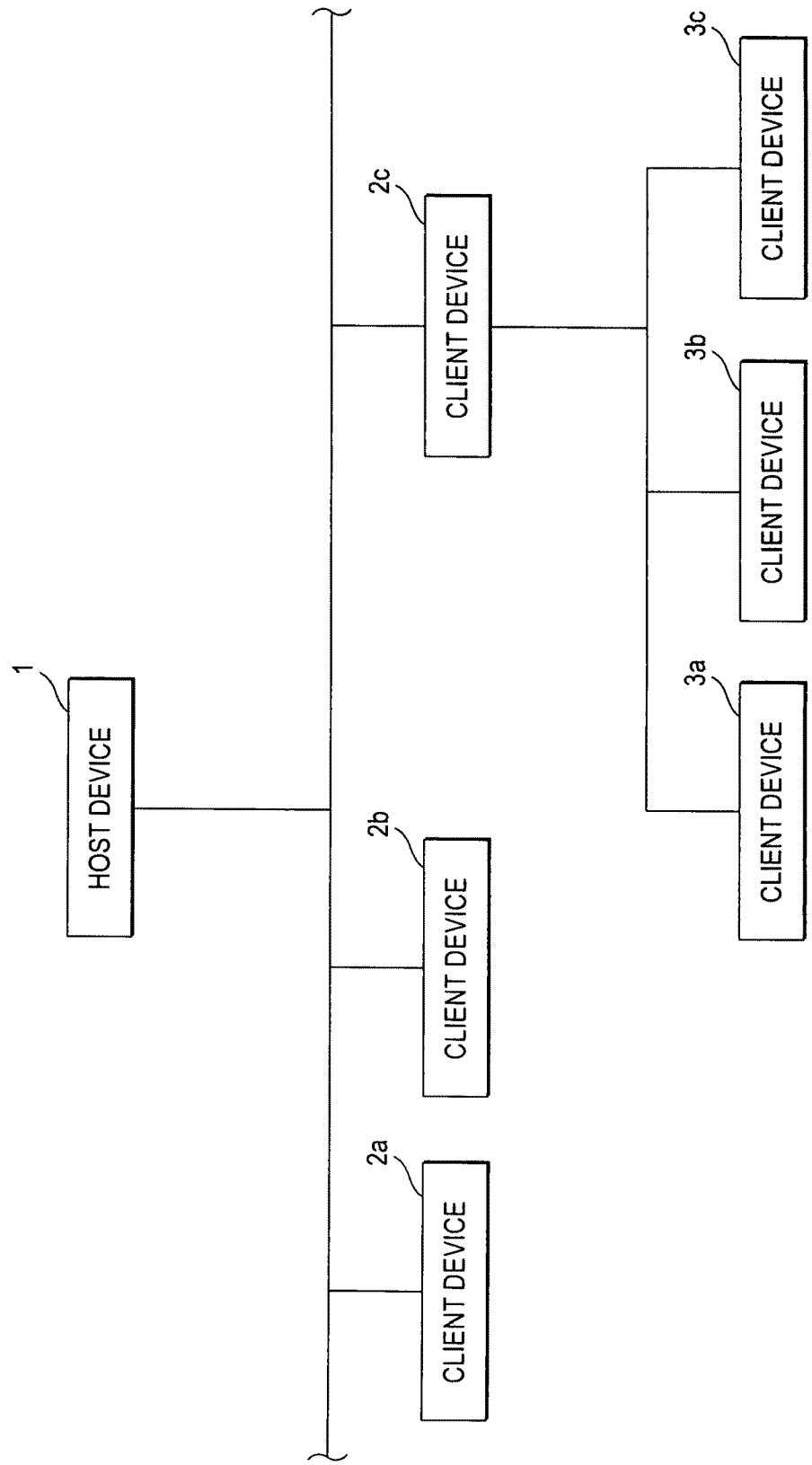
FIG. 1 is a general block diagram of a power supply system according to an embodiment of the present invention.

FIG. 1 is a schematic diagram of a power supply system of an embodiment.

As shown in FIG. 1, a host device 1 (an information processing apparatus or a computer) 1 is connected to client devices (high-level client devices) 2a, 2b, and 2c by way of a predetermined cable. The client device 2c is connected to client devices (low-level client devices or equipment) 3a, 3b, and 3c by way of a predetermined cable. Thus, a network system of tree structure is adopted in the present embodiment. This network system can be installed in; for example, an office.

Now, forming the host device 1 from; for example, a computer, a switching hub, or the like is conceivable. Moreover, forming the client devices 2a to 2c and 3a to 3c from office equipment is conceivable. Specifically, the client devices are; for example, an image forming apparatus, a printer, a personal computer, or the like. Alternatively, there are conceivable cases where the client devices are various home electrical products connected to a network, or the like. The present embodiment is described while the host device 1 and the client devices 2a to 2c and 3a to 3c are clearly distinguished from each other. However, there are conceivable cases where the host device 1 doubles as the client devices 2a to 2c and 3a to 3c.

Further, the term "predetermined cable" used herein signifies a cable intended for establishing data communication between connected devices or supplying power. In short, data are exchanged between the host device 1 and the client devices 2a to 2c and between the client device 2c and the client devices 3a to 3c, by means of a predetermined cable line for data communication. Further, the host device 1 can supply (feed) power to the client devices 2a to 2c by means of a predetermined cable line for power supply. Moreover, the client device 2c can supply power to the client devices 3a to 3c by means of the predetermined cable line. Thus, in the present embodiment, the devices are connected to each other by means of the predetermined cables capable of transmitting/receiving data and supplying power. Put another way, the host device 1 and the client devices 2a to 2c and 3a to 3c are connected to a power supply network while maintaining an ordinal relationship.

More specifically, the predetermined cable used herein includes a cable CA (see FIG. 6) formed from a pair consisting of; for example, a data communications line (a communications line) Cd (see FIG. 2 or 6) and a power supply line (a power line) Cp (see FIG. 6), a cable consisting of the data communications line Cd and a power line AP (see FIG. 2 or 6), and the like.

The power supply line Cp of this cable CA can supply power of a maximum of 12.95 W at an input voltage of: for example, 36 to 57 V. Therefore, so long as a client device is low-power equipment, the device can operate without preparing for power supply on its own. Additionally, the image forming apparatus serving as the client devices 2a to 2c of the embodiment is provided with an AC power supply as a drive power source as well as with the power supply line Cp of the cable CA. Adopting standard specifications, such as IEEE 802.3af, for supplying power to or exchanging data among the client devices 2a to 2c and 3a to 3c by way of a power feed network, such as a Power Over Ethernet [(Registered Trademark) which is hereinafter called sometimes PoE], is also conceivable as such a power supply.

Although a pair consisting of the data communications line Cd and the power supply line Cp is illustrated as an example of the predetermined cable, the present invention yields the same effect even when the predetermined cable is configured so as to superpose power on a data communications line (a communications line).

Moreover, the power line AP can supply power which is greater than the maximum amount of electric power supply of the power supply line Cp of the cable CA.

First Embodiment

Figure 2:
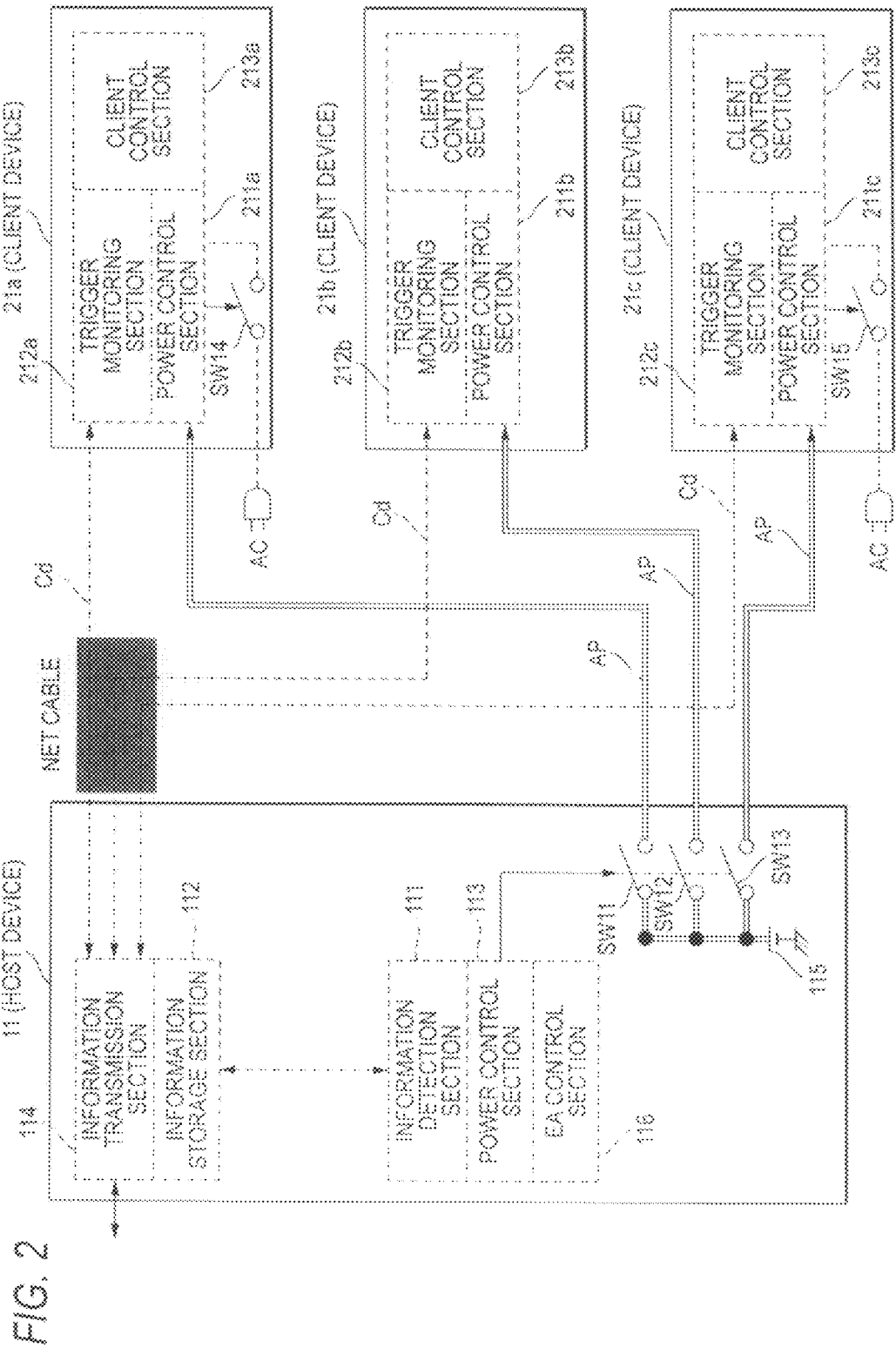
FIG. 2 is a block diagram for describing the configuration of a host device and the configuration of client devices according to a first embodiment of the present invention.

FIG. 2 is a block diagram for describing the configuration of the host device (a first device or a management device) and the configuration of the client devices (a second device, a terminal device, and a processing device) 21a, 21b, and 21c according to the first embodiment.

As shown in FIG. 2, the host device 11 and the client devices 21a, 21b, and 21c are connected to each other by means of the data communications line Cd as well as by means of the power line AP. Specifically, the data communications line Cd that establishes communication between the host device 11 and the client devices 21a, 21b, and 21c and the power line AP capable of supplying high electric power are formed from a pair of cables. Incidentally, using the data communications line Cd of the cable CA shown in FIG. 6 as the data communications line Cd is also conceivable.

As shown in FIG. 2, the host device 11 is equipped with an information detection section (command means and determination means) 111, an information storage section 112, a power control section 113, an information transmission section 114, and switches SW11, SW12, and SW13. The power control section 113 can be formed from; e.g., a CPU, and the information storage section 112 can be formed from; e.g., memory.

Moreover, the host device 11 is equipped with an energy assist section (feeding means, an internal power source, a built-in power source, and an energy assist device) 115 and an EA control section 116. This energy assist section 115 is a storage battery formed from a plurality of cells. When the switches SW11, SW12, and SW13 are turned on, the energy assist section 115 feeds electric power to the client devices 21a, 21b, and 21c.

The information detection section 111 detects received information, such as a print command, and operation information (print command processing information, status information, power on/off information, usage information, recovery time, and the like) pertaining to the low-order client devices 21a, 21b, and 21c. When a received signal requires predetermined processing, the information detection section 111 determines which one of the client devices 21a, 21b, and 21c performs processing in accordance with the information stored in the information storage section 112, and transmits a result of determination, as a command, to the power control section 113. In accordance with the information detected by the information detection section 111 and the information detected from the client devices 21a, 21b, and 21c, the information detection section 111 determines whether or not power is supplied to the client devices 21a, 21b, and 21c which have requested the amount of power required to perform processing to be described later, as well as determining the amount of power supply. At that time, when power supply requests from the plurality of client devices 21a, 21b, and 21c have been received, it is also conceivable that the information detection section 111 will prioritize the requests in terms of specifics of processing, the requested amount of power supply, and the like, and feed power to the client devices 21a, 21b, and 21c in descending sequence of priority from highest to lowest.

The information storage section 112 temporarily stores information, such as print command, and stores various types of information about the client devices 21a, 21b, and 21c connected to the host device 11. Further, the information storage section 112 stores information about the power capacity and electrical storage capacity of the energy assist section 115.

In accordance with a command from the information detection section 111, the power control section 113 switches between activation and deactivation of the switches SW11 to SW13. Additional descriptions are provided to the switch SW11. When the switch SW11 is activated by the power control section 113, power from the energy assist section 115 is supplied to the client device 21a by way of the power line AP. Further, when the switch SW11 is deactivated by the power control section 113, power supply to the client device 21a is shut off.

The same also applies to the switches SW12 and SW13. Specifically, the power control section 113 controls power supply to the client device 21b from the energy assist section 115 of the host device 11 by means of switching between activation and deactivation of the switch SW12. Further, the power supply from the energy assist section 115 of the host device 11 to the client device 21c is controlled by means of switching between activation and deactivation of the switch SW13.

When all of the switches SW11 to SW13 are activated, the power control section 113 performs power control, in accordance with a command from the information detection section 111, so as to make the amounts of power supply fed to the three power lines AP uniform or make the amounts of power supply fed by way of the three power lines AP different from each other. For instance, power control is operation for increasing the amount of power supply to the client device 21a in order to enhance the processing speed of the client device 21a and decreasing the amounts of power to the other client devices 21b and 21c.

The information transmission section 114 is for exchanging data from a device other than the client devices 21a, 21b, and 21c as well as for establishing communication among the client devices 21a, 21b, and 21c by way of the data communication line Cd.

The EA control section 116 periodically detects the power capacity of the energy assist section. Specifically, the power capacity of the energy assist section 115 is decreased as a result of feeding of power to the client devices 21a, 21b, and 21c. Upon detection of the power capacity of the energy assist section 115 being a predetermined level or less, the energy assist section 115 is recharged with an unillustrated power supply unit.

As shown in FIG. 2, the client device 21a has a power control section (request means and prediction means) 211a, a trigger monitoring section (receiving means) 212a, a client control section 213a, and the switch S14. The client device 21b has a power control section 211b, a trigger monitoring section 212b, and a client control section 213b. The client device 21c has a power control section 211c, a trigger monitoring section 212c, a client control section 213c, and the switch SW15.

The respective power control sections 211a, 211b, and 211c are connected to the power lines AP, whereby they can be provided with power supply from the host device 11. Further, the respective trigger monitoring sections 212a, 212b, and 212c are connected to the data communications line Cd, whereby they can exchange data with the host device 11.

The power control section 211a of the client device 21a controls switching between activation and deactivation of the switch SW14, and the power control section 211c of the client device 21c controls switching between activation and deactivation of the switch SW15. SW14 and SW15 may be constituted by a switch device which merely switches electric power from AC power source electrically or mechanically, or by a converter that converts AC electric power from AC power source to DC electric power.

Upon receipt of; for example, an operation command from the host device 11, the power control section 211a of the client device 21a detects the amount of power required to perform the requested operation. In accordance with the amount of detected power, the power control section 211a determines whether to bring the switch SW14 into an ON position. It is also conceivable that the power control section 211a will select issuance of a request to increase the amounts of power supply from the host device 11. Specifics of the determination rendered by the power control section 211a are transmitted to the host device 11 by way of the trigger monitoring section 212a and the data communications line Cd.

When necessary, the power control section 211a transmits the power supplied from the host device 11 to the trigger monitoring section 212a and the client control section 213a.

The power control section 211c of the other client device 21c is the same as the power control section 211a of the client device 21a, and its explanation is omitted.

The power control section 211b of the client device 21b detects the amount of power required to perform the operation commanded by the host device 11. In accordance with the amount of electric power, the power control section 211b determines to issue, to the host device 11, a request for an increase in the amount of power supply. Determined specifics are transmitted to the host device 11 by way of the trigger monitoring section 212b and the data communications line Cd.

The power control section 211b transmits, as necessary, the power supplied from the host device 11 to the trigger monitoring section 212b and the client control section 213b.

The trigger monitoring sections 212a, 212b, and 212c operate in accordance with the power from the power control sections 211a, 211b, and 211c. When supplied with power, the trigger monitoring sections establish communication with the information transmission section 114 of the host device 11 and exchange data with the information transmission section by way of the data communications line Cd.

The client control sections 213a, 213b, and 213c are for controlling individual sections (devices) of the client devices 21a, 21b, and 21c. For instance, in the case of an electrophotographic image forming apparatus, the client control sections are for driving and controlling an unillustrated exposure unit, a photosensitive drum, a fixing unit, and the like. In the case of; for example, a scanner, the client control sections are for driving and controlling a scanner drive mechanism, a reading mechanism, and the like.

Figure 3:
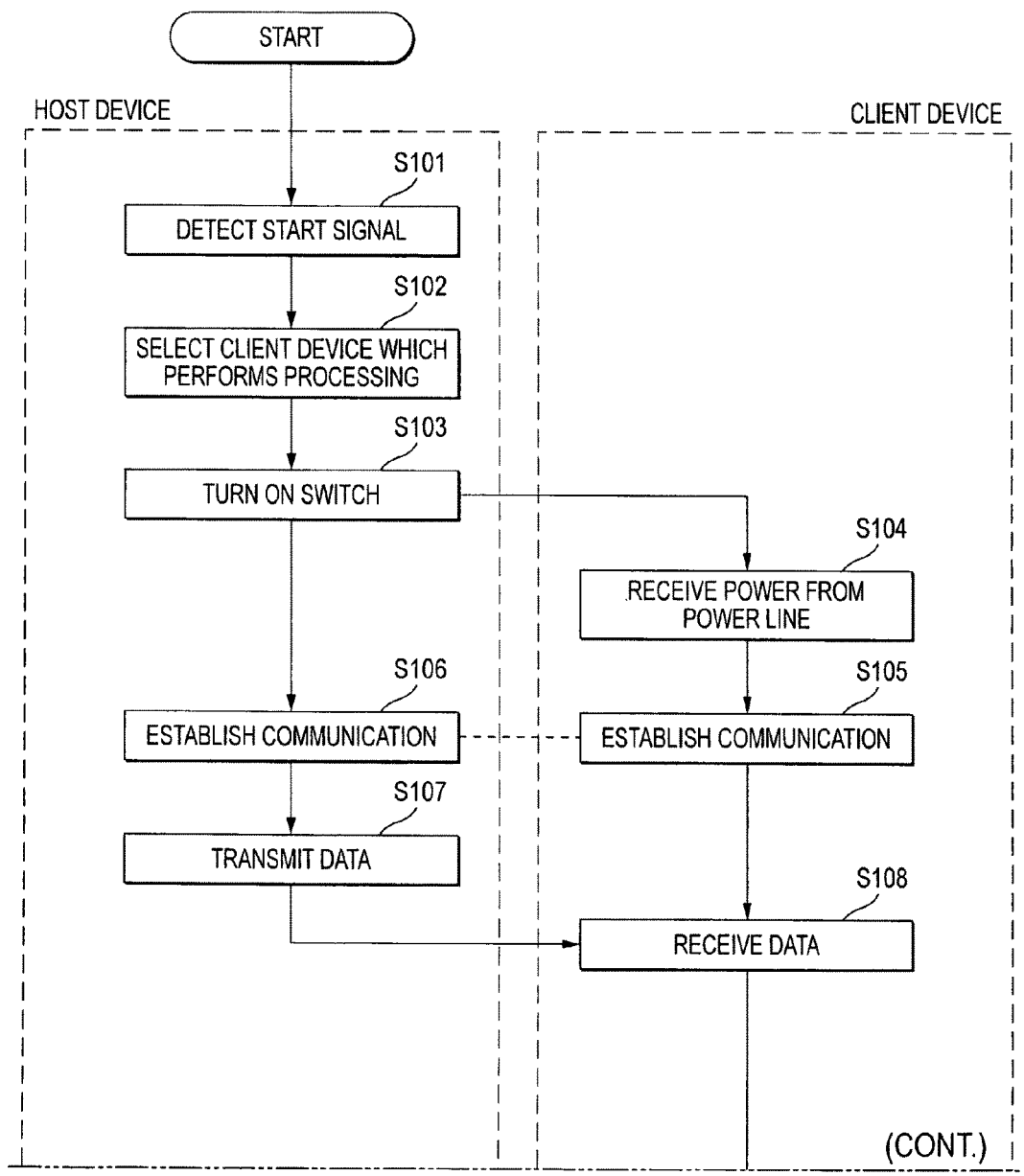
FIG. 3 is a flowchart showing processing procedures for the host device and the client devices.

FIG. 3 is flowchart showing processing procedures of the host device 11 and the client devices 21a, 21b, and 21c. Processing procedures for the host device 11 and the client device 21a and processing procedures for the host device 11 and the client device 21c are essentially identical with each other. Therefore, the processing procedures for the host device 11 and the client device 21a will be described.

In the flowcharts shown in FIG. 3A, when the information transmission section 114 of the host device 11 detects a start signal (step 101), the information detection section 111 determines which one of the client devices 21a, 21b, and 21c performs processing. Specifically, the information detection section 111 selects a client device which performs processing (step S102). For instance, when a color print processing request is received, an image forming apparatus capable of performing color printing is selected from the client devices 21a, 21b, and 21c. For instance, when a request for large amounts of monochrome prints is received, a high-speed image forming apparatus is selected. Thus, the client device to be selected changes depending on a color or monochrome mode of a job, the amount of print, and the like.

In the following descriptions, the client device 21a is assumed to have been selected.

The information detection section 111 reports a result of selection to the power control section 113. The power control section 113 having received the report activates the switch SW11 that has remained deactivated thus far (step 103). As a result, the power control section 211a of the client device 21a receives power from the power line AP (step 104). Specifically, the power control section 211a of the client device 21a receives power supply from the power line AP. When the power control section 211a has detected receipt of power, the power is delivered to the trigger monitoring section 212a. The trigger monitoring section 212a having received power operates in such a way that there is established communication with the information transmission section 114 of the host device 11 by way of the data communications line Cd (steps 105 and 106).

The information detection section 111 commands the information transmission section 114 to transmit the print command data stored in the information storage section 112 to the client device 21a. The information transmission section 114 having received the command transmits the print command data to the trigger monitoring section 212a of the client device 21a by way of the data communications line Cd (step 107). Upon receipt of the print command data (step 108), the trigger monitoring section 212a sends the data to the power control section 211a. The power control section 211a predicts the amount of power required for printing (step 109) and reports the predicted amount of power (a result of prediction) to the information transmission section 114 of the host device 11 by way of the trigger monitoring section 212a and the data communications line Cd (step 110).

In the host device 11, when the information transmission section 114 has received the report from the client device 21a (step 111), the power control section 113 determines whether or not the required amount of power can be supplied (step 112). When determined that supply of the required amount of power is impossible, the power control section 113 provides the client device 21a with a notice that power supply is impossible, by way of the information transmission section 114 and the data communications line Cd (step 113). Upon receipt of the notice (step 114), the power control section 211a starts processing (step 117) after having activated the switch SW14 (step 115).

In the meantime, when it is determined, in step 112, that the required amount of power can be supplied to the client device 21a, the power control section 113 controls the amount of power supply (step 116). Specifically, the power control section 113 controls the amount of electric power supplied from the switch SW11, to thus supply a required amount of power. Upon detection of supply of the required amount of power, the client device 21a initiates processing (step 117).

When print processing is completed (step 118), the client control section 213a provides the power control section 211a with a notice of completion of print processing. When the switch SW14 is active (step 119), the power control section 211a having received the notice deactivates the switch SW14 (step 120). The power control section 211a provides the information transmission section 114 of the host device 11 with a notice of completion of processing commanded by the host device 11 and a permission to deactivate the power supply, through transmission, by way of the trigger monitoring section 212a and the data communications line Cd (step 121).

When the information transmissions section 114 has received a processing end signal for the client 21a (step 122), the information detection section 111 commands the power control section 113 to deactivate the switch SW11. The power control section 113 having received the command deactivates the switch SW11 (step 123), whereupon a round of processing operations is completed.

Figure 4:
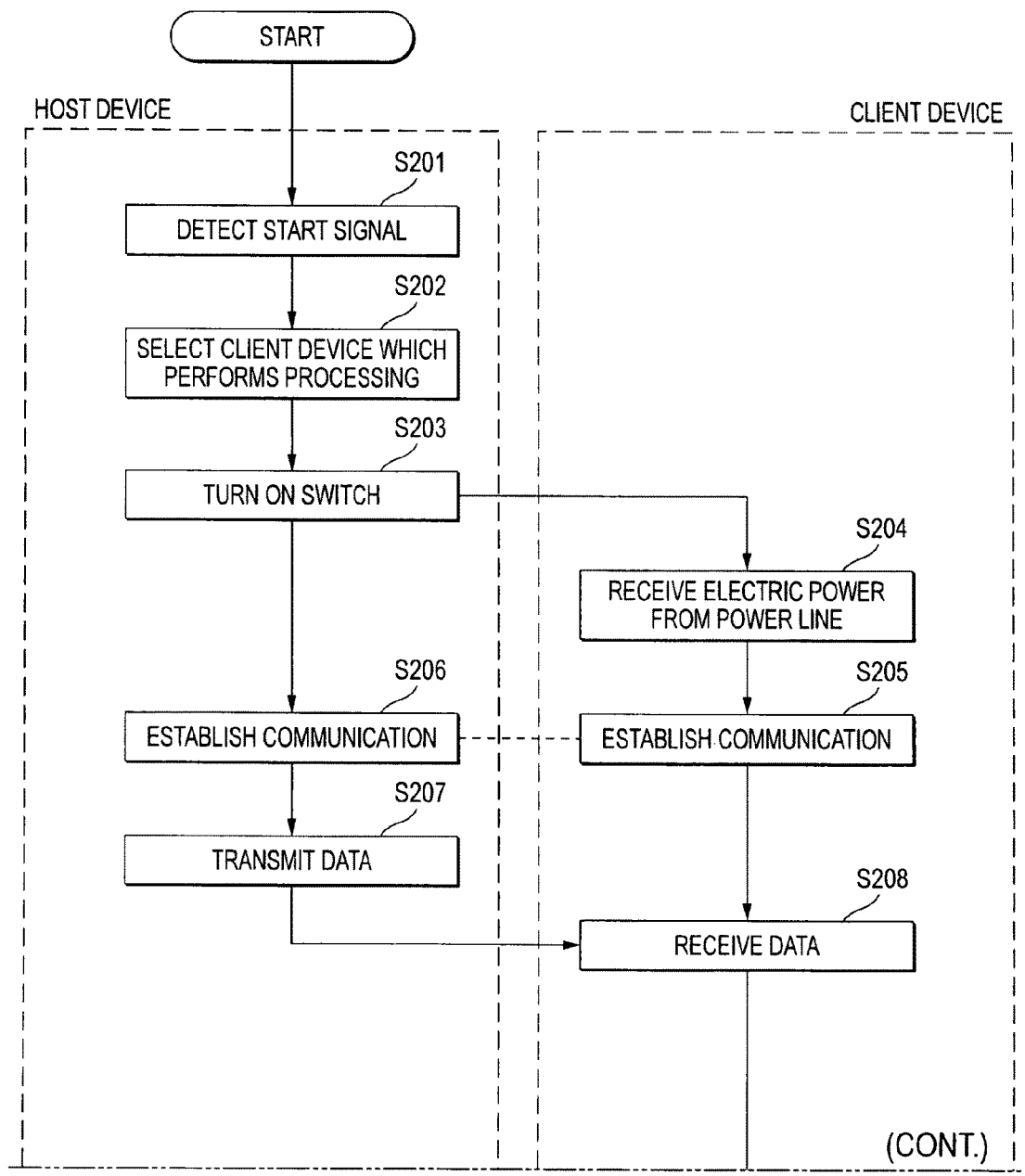
FIG. 4 is a flowchart showing processing procedures for the host device and the client devices.

FIG. 4 is flowchart showing processing procedures for the host device 11 and the client device 21b. This flowchart showing processing procedures for the case where the client device 21b is a printer.

According to the flowcharts shown in FIG. 4, when the information transmission section 114 of the host device 11 has detected a start signal (step 201), the information detection section 111 selects a client device which performs processing (step 202). In the following descriptions, the client device 21b is assumed to have been selected.

The information detection section 111 reports a result of selection to the power control section 113, and the power control section 113 having received the report activates the switch SW12 that has remained deactivated thus far (step 203). As a result, the power control section 211b of the client device 21b receives power from the power line AP (step 204). When the power control section 211b has detected receipt of power, the power is delivered to the trigger monitoring section 212b. The trigger monitoring section 212b operates in such a way that there is established communication with the information transmission section 114 of the host device 11 by way of the data communications line Cd (steps 205 and 206).

The information detection section 111 commands the information transmission section 114 to transmit data stored in the information storage section 112 to the client device 21b. The information transmission section 114 having received the command transmits the data to the trigger monitoring section 212b of the client device 21b by way of the data communications line Cd (step 207). Upon receipt of the data (step 208), the trigger monitoring section 212b sends the data to the power control section 211b. The power control section 211b predicts the amount of power required for printing (step 209) and reports the predicted amount of power (a result of prediction) to the information transmission section 114 of the host device 11 by way of the trigger monitoring section 212b and the data communications line Cd (step 210).

In the host device 11, when the information transmission section 114 has received the report from the client device 21b (step 211), the power control section 113 determines whether or not the required amount of power can be supplied (step 212). When determined that supply of the required amount of power is impossible, the power control section 113 provides the client device 21b with a notice that power supply is impossible, by way of the information transmission section 114 and the data communications line Cd (step 213). Upon receipt of the notice (step 214), the notice that commanded processing has not been performed is transmitted to the information transmission section 114 of the host device 11 by way of the trigger monitoring section 212b and the data communications line Cd (step 215). Specifically, since the client device 21b does not have any power source, the client device cannot perform processing unless supplied with the amount of power required to perform the commanded processing. Hence, there is sent notice that processing is not performed. It is also conceivable that the client control section 213b performs processing; for example, at lower processing speed rather than normal processing speed.

In the meantime, when it is determined, in step 212, that the required amount of power can be supplied to the client device 21b, the power control section 113 controls the amount of power supply (step 216). Specifically, the power control section 113 controls the amount of electric power supplied from the switch SW12, to thus supply a required amount of power. Upon detection of supply of the required amount of power, the client device 21b initiates processing (step 217).

When print processing is completed (step 218), the client control section 213b provides the power control section 211b with a notice of completion of print processing. The power control section 211b provides the information transmission section 114 of the host device 11 with a notice of completion of processing commanded by the host device 11 and a permission to deactivate the power supply, through transmission, byway of the trigger monitoring section 212b and the data communications line Cd (step 219).

When the information transmissions section 114 has received a processing end signal for the client 21b (step 220), the information detection section 111 commands the power control section 113 to deactivate the switch SW12. The power control section 113 having received the command deactivates the switch SW12 (step 221), whereupon a round of processing operations is completed.

Even when the information transmission section 114 has received, from the client device 21b, the notice that processing is not performed (step 220), the switch SW12 is deactivated (step 221), and a round of processing operations is terminated.

Figure 5A:
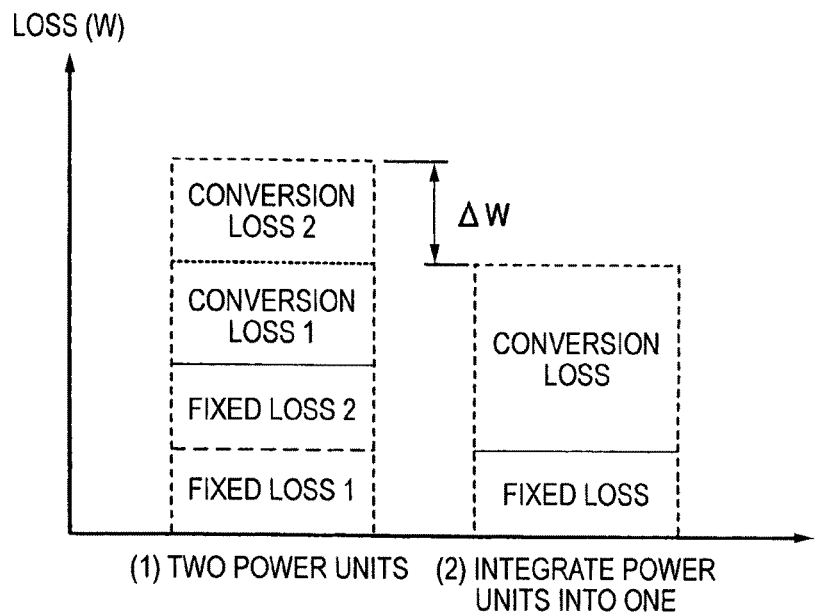
FIGS. 5A and 5B are views for describing power conversion efficiency of a system equipped with a plurality of devices, wherein a vertical axis in FIG. 5A represents a loss (W) induced by power conversion, a vertical axis in FIG. 5B represents power conversion efficiency (%), and a horizontal axis in FIG. 5B represents load power (W)
Figure 5B:
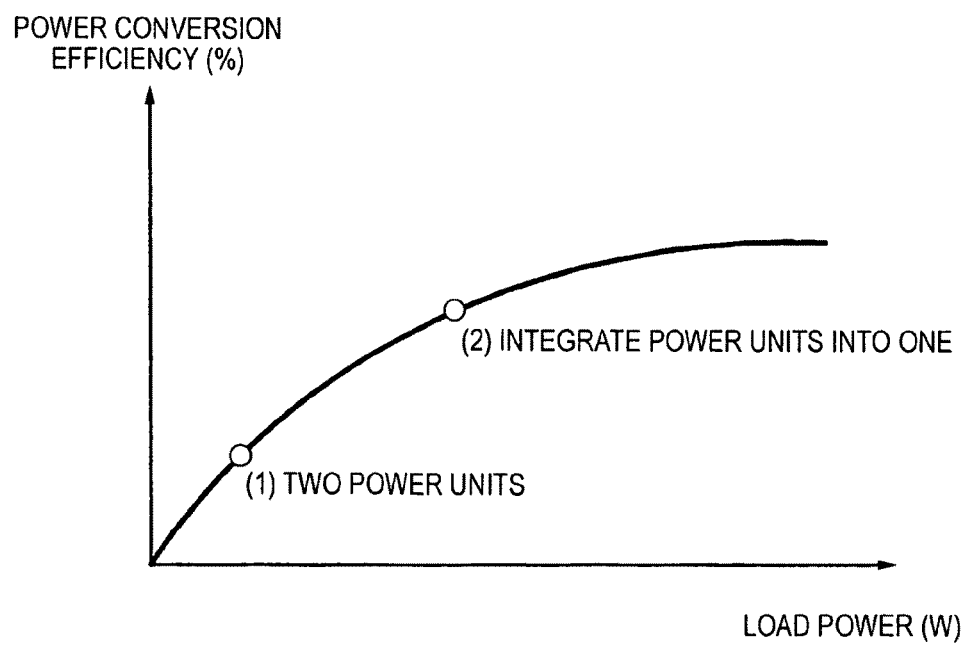

FIG. 5 is a view for describing the power conversion efficiency of a system having a plurality of devices. FIG. 5A is a plot showing the case where power units of the respective two devices are used; namely, where two power units are used [indicated by (1) in FIG. 5A] and a case where power is supplied to two devices from one power unit [indicated by (2) in FIG. 5A]. The vertical axis of the plot shows the amount of loss (W) stemming from power conversion. Further, FIG. 5B is a plot showing power conversion efficiency achieved at (1) and (2) in FIG. 5A. The vertical axis of the plot shows power conversion efficiency (%), and the horizontal axis of the same represents load power (W).

The word "power conversion efficiency" used herein signifies efficiency at which power to be input and output is converted and which is expressed as a value. Put another way, the power conversion efficiency is a ratio of input power to output power. The power conversion efficiency assumes a value of one or less. The greater the value, the higher efficiency and the smaller an internal loss.

In the present embodiment, the client devices 21a, 21b, and 21c determine whether or not there is power shortage. However, it is also conceivable that the host device 11 will determine whether or not power of the client devices 21a, 21b, and 21c is deficient.

As shown in FIG. 5A, losses induced by power conversion include a conversion loss and a fixed loss. The conversion loss is one which varies according to the magnitude of power to be converted, and the fixed loss is one which arises at all times during conversion regardless of the magnitude of power to be converted. Consequently, in the case of two power units [(1)

in FIG. 5A], a conversion loss 1 of the first power unit and a conversion loss 2 of the second power unit arise. A fixed loss 1 of the first power unit and a fixed loss 2 of the second power unit also arise. Specifically, fixed losses for two power units arise. In the meantime, in the case of one power unit [(2) in FIG. 5A], the conversion loss increases, but a fixed loss only for one power unit arises.

The plot shown in FIG. 5B shows a parabolic curve rather than a straight line. Consequently, power conversion efficiency is not proportional to load power. In more detail, smaller load power does not necessarily mean superior power conversion efficiency. Likewise, greater load power does not necessarily mean worse power conversion efficiency. As load power becomes smaller, the proportion of a fixed loss in losses becomes greater, and power conversion efficiency becomes worse. Therefore, in a state where small load power is achieved, power conversion efficiency becomes high by integrated use of one power unit rather than by use of two power units. Thus, there may be the case where losses are reduced by means of paying attention, at the time of power control, to load power of the power rather than the number of power units.

From these viewpoints, in the present embodiment, the host device 11 and the client devices 21a, 21b, and 21c are connected together by means of the power line AP that supplies greater power. Further, the client devices 21a, 21b, and 21c are configured so as to receive power from the host device 11 in normal times by way of the power line AP. Meanwhile, the client device 21a having the switch SW14 switches the switch SW14 to the ON position when the power control section 211a has determined that the power supply from the host device 11 will become deficient. When the power control section 211c has determined that the power supply from the host device 11 will become deficient, the client device 21c having the switch SW15 switches the switch SW15 to the ON position. As mentioned above, when power consumption is low, power is supplied from one power unit to a plurality of devices. In the meantime, when power consumption has become great, plural power units are used. Thus, the number of power units used in the entire system is reduced.

Second Embodiment

Figure 6:
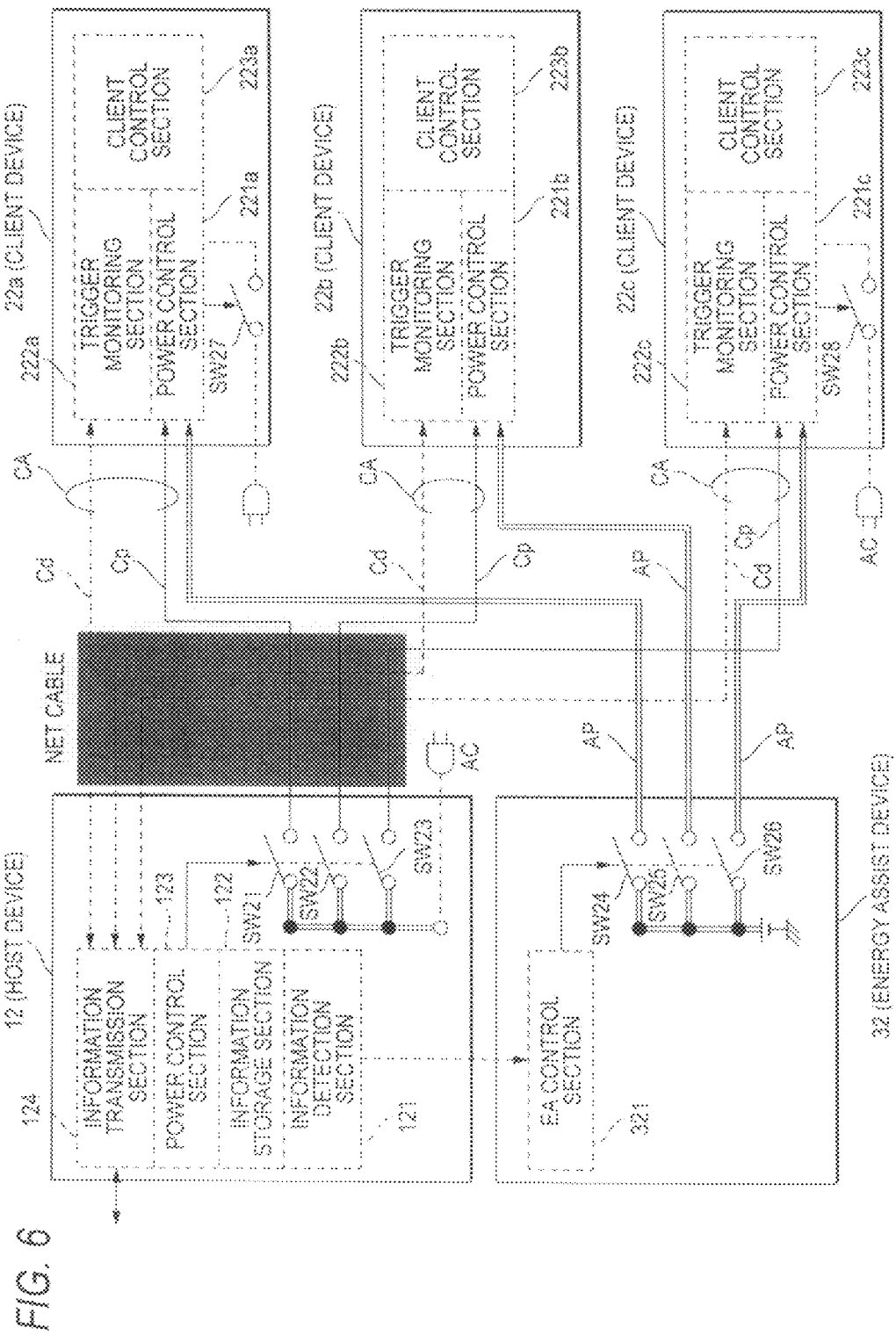
FIG. 6 is a block diagram for describing the configuration of a host device, the configuration of client devices, and the configuration of an energy assist device according to a second embodiment of the present invention.

FIG. 6 is a block diagram for describing the configuration of a host device 12, the configuration of client devices 22a, 22b, 22c, and the configuration of an energy assist device 32.

As shown in FIG. 6, the host device 12 has an information detection section (a PoE information detection section) 121, an information storage section 122, a power control section (a PoE power control section) 123, an information transmission section 124, and switches SW21, SW22, and SW23.

The information detection section 121 detects received information, such as a print command, and operation information (print command processing information, status information, power on/off information, usage information, recovery time, and the like) pertaining to the low-order client devices 22a, 22b, and 22c. When a received signal requires predetermined processing, the information detection section 121 determines which one of the client devices 22a, 22b, and 22c performs processing in accordance with the information stored in the information storage section 122, and transmits a result of determination, as a command, to the power control section 123. Specifically, the information detection section 121 analyzes operation information; namely, print command processing information, and selects a client device more optimum for print mode from the client devices 22a, 22b, and 22c.

In accordance with the information detected by the information detection section 121 and the information detected from the client devices 22a, 22b, and 22c, the information detection section 121 determines whether or not power is supplied to the client devices 22a, 22b, and 22c, as well as determining the amount of power supply.

The information storage section 122 temporarily stores information, such as print command, and stores various types of information about the client devices 22a, 22b, and 22c connected to the host device 12. Further, the information storage section 122 stores information about the power capacity and electrical storage capacity of the energy assist device 32.

In accordance with a command from the information detection section 121, the power control section 123 switches between activation and deactivation of the switches SW21 to SW23. Additional descriptions are provided to the switch SW21. When the switch SW21 is activated by the power control section 123, power is supplied to the client device 22a by way of the power supply line Cp of the cable CA. Further, when the switch SW21 is deactivated by the power control section 123, power supply to the client device 22a is shut off.

The same also applies to the switches SW22 and SW23. Specifically, the power control section 123 controls power supply to the client device 22b by means of switching between activation and deactivation of the switch SW22. Further, power supply to the client device 22c is controlled by means of switching between activation and deactivation of the switch SW23.

The power control section 123 commands the energy assist device 32 to switch between activation and deactivation of the switches SW24, SW25, and SW26.

Thus, when necessary, the power control section 123 controls switching between activation and deactivation of the switches SW21 to SW23 of the host device 21 and the switches SW24 to SW26 of the energy assist device 32.

The information transmission section 124 is for exchanging data from a device other than the client devices 22a, 22b, and 22c as well as for establishing communication among the client devices 22a, 22b, and 22c by way of the data communication line Cd of the cable CA.

As shown in FIG. 6, the energy assist device 32 has an EA control section (energy assist control section) 321 and the switches SW24, SW25, and SW26.

The EA control section 321 controls switching between activation and deactivation of the switches SW24 to SW26. Put another way, the EA control section 321 switches among the switches SW24 to SW26 in accordance with a command from the host device 12. Specifically, when the switch SW24 is activated by means of the EA control section 321, the client device 22a is supplied with power by way of the power line AP. When the switch SW24 is deactivated by means of the EA control section 321, power supply to the client device 22a is shut off.

The same also applies to the switches SW25 and SW26. Specifically, the power control section 321 controls power supply to the client device 22b by means of switching between activation and deactivation of the switch SW25. Further, power supply to the client device 22c is controlled by means of switching between activation and deactivation of the switch SW26.

In more detail, the form of power supply to the client device 22a changes by means of switching between activation and deactivation of the switch SW21 of the host device 12 and the switch SW24 of the energy assist device 32. Specifically, any one is selected from the cases where power is supplied from the host device 12 by way of the power supply line Cp of the cable CA; where power is supplied from the energy assist device 32 by way of the power line AP; and where power is supplied from the host device 12 by way of the power supply line Cp of the cable CA and where power is supplied from the energy assist device 32 by way of the power line AP.

Selection of such a form of power supply is practicable without regard to whether a switch SW27 of the client device 22a, which will be described later, is activated or deactivated. Consequently, the client device 22a can receive power supply from the host device 12 and/or the energy assist device 32 while the switch SW27 of the client device 22a remains deactivated. Further, the client device 22a can receive power supply from the host device 12 and/or the energy assist device 32 while the switch SW27 of the client device 22 remains deactivated.

Selection of the form of power supply to the other client devices 22b and 22c is also the same as that in the case of the previously-described client device 22a, and hence their explanations are omitted. In addition, standardizing the form of power supply to the client devices 22a, 22b, and 22c is also conceivable, or making the form of power supply to the client devices 22a, 22b, and 22c different is conceivable, too.

As shown in FIG. 6, the client device 22a has a power control section 221a, a trigger monitoring section 222a, a client control section 223a, and the switch S27. The client device 22b has a power control section 221b, a trigger monitoring section 222b, and a client control section 223b. Specifically, the client device 22b does not have a switch like the switch SW27 of the client device 22a. Moreover, the client device 22c has a power control section 221c, a trigger monitoring section 222c, a client control section 223c, and a switch SW28. The SW27 and SW28 may be constisuted, as with SW14 and SW15, by a switch device which merely switches electric power from AC power source electrically or mechanically, or by a converter that converts AC electric power from AC power source to DC electric power.

The respective power control sections 221a, 221b, and 221c are connected to the power supply line Cp of the cable CA and the power lines AP, whereby they can be provided with power supply from the host device 12. Further, the respective trigger monitoring sections 222a, 222b, and 222c are connected to the data communications line Cd, whereby they can exchange data with the host device 12.

The power control section 221a of the client device 22a controls switching between activation and deactivation of the switch SW27, and the power control section 221c of the client device 22c controls switching between activation and deactivation of the switch SW28.

Upon receipt of; for example, any operation command from the host device 12, the power control section 221a of the client device 22a detects the amount of power required to perform the requested operation. In accordance with the amount of detected power, the power control section 221a determines whether or not power supply from the host device 12 and/or the energy assist device 32 while the switch SW27 remains deactivated or whether to switch the switch SW27 to an ON position, to thus receive power supply from the host device 12 and/or the energy assist device 32. Specifics of the determination rendered by the power control section 221a are transmitted to the host device 12 by way of the trigger monitoring section 222a and the data communications line Cd. It is also conceivable that the power control section 221a will bring the switch SW27 into the ON position in lieu of receiving power supply from the energy assist device 32.

When necessary, the power control section 221a transmits the power supplied from the host device 12 and/or the energy assist device 32 and the power supplied from an AC power source connected to the client device 22a via SW27 to the trigger monitoring section 222a and the client control section 223a.

The power control section 221c of the other client device 22c is the same as the power control section 221a of the client device 22a, and its explanation is omitted.

The power control section 221b of the client device 22b detects the amount of power required to perform the operation commanded by the host device 12. In accordance with the thus-detected amount of electric power, the power control section 221b determines to receive power supply from either the host device 12 or the energy assist device 32 or from both of them. Determined specifics are transmitted to the host device 12 by way of the trigger monitoring section 222b and the data communications line Cd.

The power control section 221b transmits, as necessary, the power supplied from the host device 12 and/or the energy assist device 32 to the trigger monitoring section 222b and the client control section 223b.

The trigger monitoring sections 222a, 222b, and 222c operate in accordance with the power from the power control sections 221a, 221b, and 221c. When supplied with power, the trigger monitoring sections establish communication with the information transmission section 124 of the host device 12 and exchange data with the information transmission section by way of the data communications line Cd.

Further, the client control sections 223a, 223b, and 223c are for controlling individual sections (devices) of the client devices 22a, 22b, and 22c.

Figure 7:
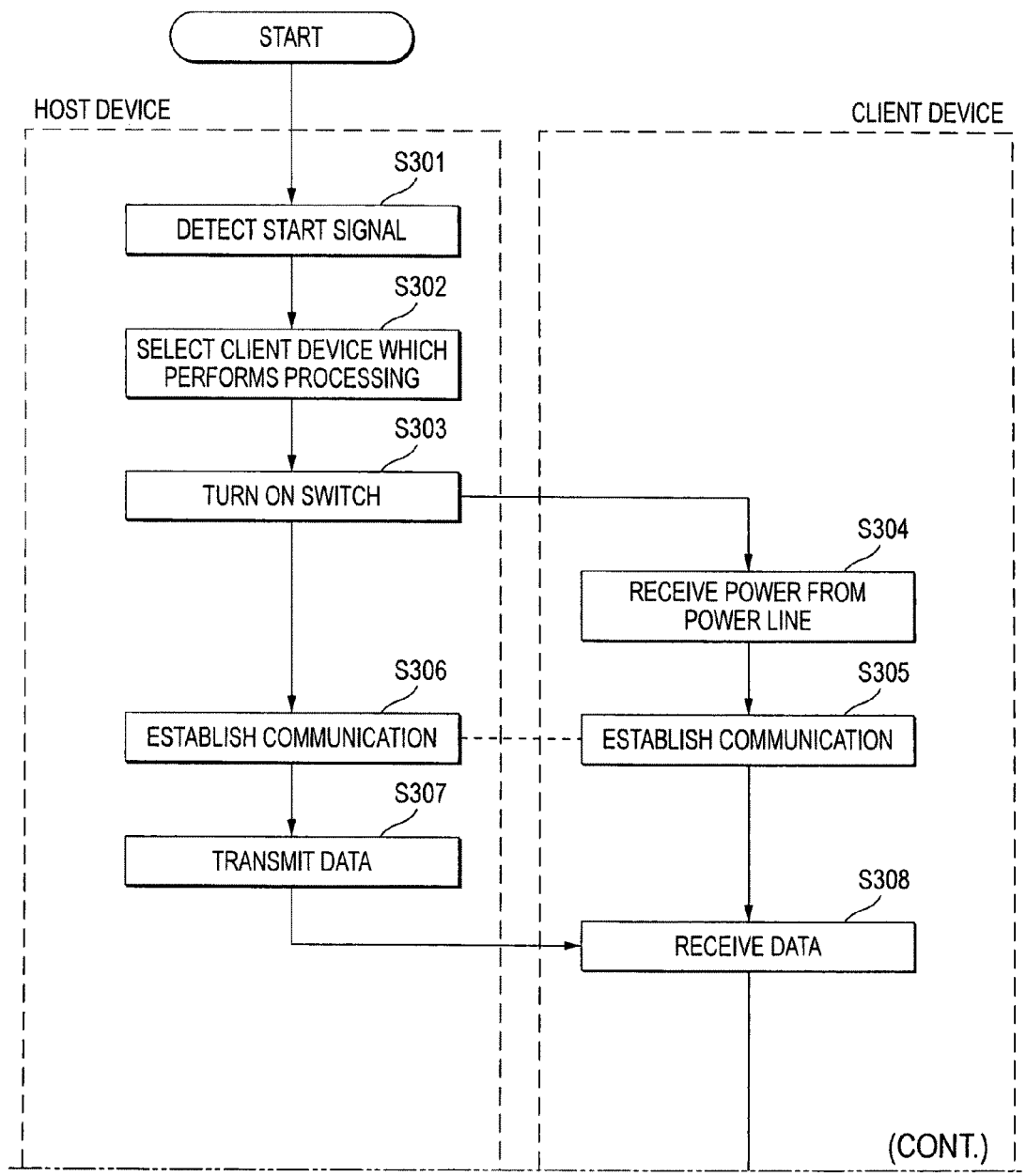
FIG. 7 is a flowchart showing processing procedures for the host device and the client devices.

FIG. 7 is flowchart showing processing procedures of the host device 12 and the client devices 22a, 22b, and 22c. Processing procedures for the host device 12 and the client device 22a, processing procedures for the host device 12 and the client device 22b, and processing procedures for the host device 12 and the client device 22c are essentially identical with each other. Therefore, the processing procedures for the host device 12 and the client device 22a will be described.

In the flowchart shown in FIG. 7, when the information transmission section 124 of the host device 12 detects a start signal (step 301), the information detection section 121 determines which one of the client devices 22a, 22b, and 22c performs processing. Specifically, the information detection section 121 selects a client device which performs processing (step S302). In the following descriptions, the client device 22a is assumed to have been selected.

The information detection section 121 reports a result of selection to the power control section 123. The power control section 123 having received the report activates the switch SW21 that has remained deactivated thus far (step 303). As a result, the power control section 221a of the client device 22a receives power from the power supply line Cp of the cable CA (step 304). Specifically, the power control section 221a of the client device 22a receives power supply from the power supply line Cp. When the power control section 221a has detected receipt of power, the power is delivered to the trigger monitoring section 222a. The trigger monitoring section 222a having received power operates in such a way that there is established communication with the information transmission section 124 of the host device 12 by way of the data communications line Cd of the cable CA (steps 305 and 306).

The information detection section 121 commands the information transmission section 124 to transmit the print command data stored in the information storage section 122 to the client device 22a. The information transmission section 124 having received the command transmits the print command data to the trigger monitoring section 222a of the client device 22a by way of the data communications line Cd (step 307). Upon receipt of the print command data (step 308), the trigger monitoring section 222a sends the data to the power control section 221a. The power control section 221a predicts the amount of power required for printing (step 309) and reports the predicted amount of power to the information transmission section 124 of the host device 12 by way of the trigger monitoring section 222a and the data communications line Cd (step 310).

In the host device 12, when the information transmission section 124 has received the report from the client device 22a (step 311), specifics of the request are sent to the information detection section 121. The information detection section 121 determines whether or not the required amount of power can be supplied (step 312). When determined that supply of the required amount of power is impossible, the information detection section 121 commands the EA control section 321 of the energy assist device 32 to bring the switch SW24 into the ON position. The EA control section 321 having received the command switches the switch SW24 to the ON position (step 313). As a result, the client device 22a receives power supply from the energy assist device 32 by way of the power line AP.

Subsequently, the information detection section 121 commands the client device 22a to bring the switch SW27 into the ON position of the client device 22a (step 314). Specifically, the required amount of power cannot be covered by only the amount of power supply from the host device 12. Hence, the power control section 123 commands the client device to use its internal power unit (SW27); in other words, the client device 22a performs processing by using power from the internal power unit in addition to the power supply from the power supply line Cp and the power supply from the power line AP.

Upon receipt of the command to activate the switch from the host device 12 (step 315), the power control section 221a of the client device 22a brings the switch SW27 into the ON position (step 316). As a result, the amount of power consumed by the client device 22a is increased.

In the meantime, when it is determined, in step 312, that the required amount of power can be supplied to the client device 22a, the information detection section 121 causes the EA control section 321 to bring the switch SW24 into the ON position (step 318) as in the case of step 313 mentioned above, when power supply fed by way of the power line is required, and subsequently controls the amount of supply power (step 319). The client device 22a is supplied with power from the host 12 as well as from the energy assist device 32. Thus, when the required amount of power supply is fed, processing proceeds to step 320. When power supply performed by way of the power line is determined not to be necessary in step 317, processing proceeds to step 320.

When ascertained that the required amount of power is ensured, the power control section 221a of the client device 22a commences processing (step 320). Even when a target amount of power is not attained despite activation of the switch SW27, it is also conceivable that processing will be performed by means of decreasing processing speed rather than processing being performed at high speed.

When processing has been completed (step 321), the power control section 221a deactivates the SW27 when the switch SW27 is in the ON position (steps 322 and 323). Subsequently, completion of processing is transmitted to the information transmission section 124 of the host device 12 by way of the trigger monitoring section 222a and the data communications line Cd (step 324).

When the information transmission section 124 has received completion of processing from the client device 22a (step 325), the host device 12 transmits the thus-received message to the information detection section 121. The information detection section 121 commands the power control section 123 to deactivate the switch SW21, commanding the EA control section 321 of the energy assist device 32 to deactivate the switch SW24 (step 326). Thus, a round of processing operations is completed.

As mentioned above, in the present embodiment, when the host device 12 is connected to the plurality of client devices 22a, 22b, and 22c, the host device 12 makes a prediction from various types of pieces of trigger information and storage information·PoE information. Performance, such as the required number of client devices, a standby mode, and a print speed of the image forming apparatus, and the amount of power supplied by means of power line communication as in the case of PoE and the power supply from the energy assist device 32, such as a storage battery, are adjusted through switching operation.

For instance, when availability ratio of the devices is low in the office, as in the early morning, in lunch time, and at night, the host device 12 stops power supply from the power supply line Cp and the power line Ap, thereby bringing all of the entire client devices into nonoperating status. When a processing request, such as a print command, has been received, required client devices and the number thereof are computed. Power is supplied by way of the power supply line Cp, to thus activate the client devices 22a, 22b, and 22c to perform printing operation, or the like. At that time, when the client devices 22a, 22b, and 22c or the host device 12 has detected a deficiency in working power of the client devices 22a, 22b, and 22c, the deficiency is addressed by means of additional power supply from the energy assist device 32.

In addition, it is also conceivable that the host device 12 will make a determination whether to uniformly send the power supply from the energy assist device 32 to all or some of the client devices having received a start-up command in consideration of the supply capability of a battery section or to supply all power to only one of the client devices. Moreover, it is also conceivable that the client devices will be operated by means of the power supply from the energy assist device in conjunction with a supply of commercial power. Specifically, when data are extracted from the image forming apparatus, power of the order of 10 to 30 W is sufficient. Hence, the image forming apparatus operates at power supply from the power supply line Cp. Further, at the time of reading or facsimile transmission, switching is made from power supply from the power supply line Cp to power supply from the power line AP. At the time of printing operation, it is also conceivable to additionally supply commercial power and power from the host device 12 and/or the energy assist device 32 by means of activation of the switches SW27 and SW28. The amount of power used by the client devices 22a and 22c is ensured so as to become greater than the amount of commercial power, thereby shortening a warm-up time or increasing printing speed as compared the sprinting speed achieved in normal times. Thus, the host device 12 controls feeding of additional power supply commensurate with the power consumed by the plurality of client devices 22a, 22b, and 22c connected to the host device 12.

Third Embodiment

Figure 8:
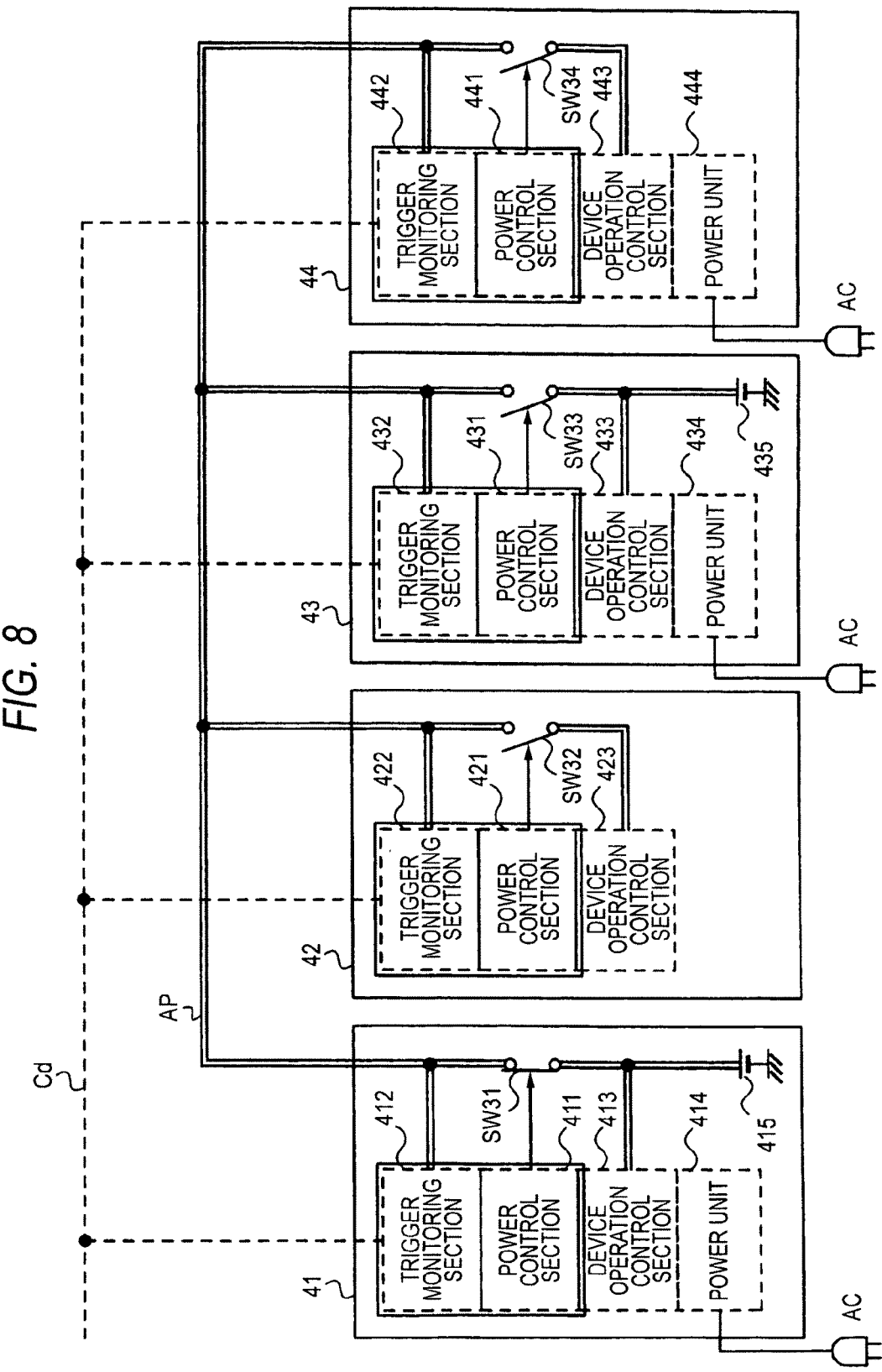
FIG. 8 is a block diagram for describing the configuration of a device according to a third embodiment of the present invention.

FIG. 8 is a block diagram for describing the configuration of devices 41, 42, and 43 of a third embodiment of the present invention.

As shown in FIG. 8, the devices 41, 42, and 43 are connected together by means of the power line AP as well as by means of the data communications line Cd. Specifically, the devices 41, 42, and 43 are connected in parallel to the data communications line Cd and the power line AP. In more detail, the data communications line C is connected to devices other than the devices 41, 42, and 43, as well.

As shown in FIG. 8, the device 41 has a power control section 411, a trigger monitoring section 412, a device operation control section 413, a power unit 414, an energy assist section 415, and a switch SW31. The device 41 has a power control section 421, a trigger monitoring section 422, a device operation control section 423, and a switch SW32.

The device 42 is identical in configuration with the device 41. Specifically, the device 43 has a power control section 431, a trigger monitoring section 432, a device operation control section 433, a power unit 434, an energy assist section 435, and a switch SW33. The device 44 is also equipped with a power control section 441, a trigger monitoring section 442, a device operation control section 443, a power unit 444, and a switch SW34.

As mentioned above, the devices 41, 42, 43, and 44 are identical with each other in terms of the basic configuration. However, the devices 41, 43, and 44 are different from the device 42 in that the devices have the power units 414, 434, and 444. Further, the devices 41 and 43 are different from the devices 42 and 44 in that the devices 41 and 43 have the energy assist sections 415 and 435.

The power control sections 411, 421, 431, and 441 switch between activation or deactivation of the switches SW31, SW32, SW33, and SW34.

The trigger monitoring sections 412, 422, 432, and 442 are connected to the power line AP at all times and are operated by means of power from this power line AP. When supplied with power, the trigger monitoring sections establish communication with the other devices 41 to 44 by way of the data communications line Cd and exchange data with the devices.

The device operation control sections 413, 423, 433, and 443 are for controlling individual sections (individual devices). In the case of; for example, an electrophotographic image forming apparatus, the device operation control sections are for driving and controlling an unillustrated exposure device, a photosensitive drum, a fixing unit, and the like. Further, the device operation control sections 413, 423, 433, and 443 are supplied with power from the power line AP as a result of the switches SW31, SW32, SW33, and SW34 being switched to the ON position.

The power units 414, 434, and 444 are built-in low voltage power source (LVPS: Low Voltage Power Supply). When supplied with AC power, the power units 414, 434, and 444 supply the power to the device operation control sections 413, 433, and 434. Further, when supplied with AC power, the power units 414 and 434 supply power to the energy assist sections 415 and 435.

As a result of the switches SW31 and SW33 being switched to the ON position, the energy assist sections 415 and 435 supply power to the other devices 42 and 44 by way of the power line AP.

Any one of the thus-configured devices 41, 42, 43, and 44 serves as a host device. Moreover, the one device that behaves as the host device as mentioned above does not necessarily remain unchanged once determined. There are occasions where the one device is replaced with another device as required. Specifically, the host device does not remain fixed at all times.

Specifically speaking, any one of the devices as a host is determined by use of predetermined host standards. Further, a determination as to whether or not the host device is switched to another device is made by use of a predetermined switching standard. The term "predetermined switching standard" includes requirements for a supplier and requirements for another supplier to which a change is made.

The predetermined host standard is to satisfy all three requirements; for example, a high availability ratio, high power supply capability, and high processing capability. There is a case where attention is paid to the degree of allowance of power supply as the predetermined switching standard. There is also a case where attention is paid to; for example, an operation mode. By way of example, requirements for a supplier are no margin of power supply, and requirements for another supplier are a sufficient margin of power supply (first requirements). Further, by way of another example, the requirements for a supplier are an operation mode continuously remaining in a standby mode for long hours, and the requirements for another supplier are an operation mode being a mode other than a power-saving mode (second requirements).

For instance, when the device 41 satisfies the predetermined host requirements, the device 41 becomes a host device and supplies standby power to the power control sections 421, 431, and 441 and the trigger monitoring sections 422, 432, and 442 of the other devices 42, 43, and 44.

When the device 41 has not fulfilled the supplier requirements of the predetermined switching requirements, any of the other devices 42, 43, and 44 satisfying the requirements for another supplier becomes a host device.

When performance of processing by use of a plurality of devices is determined to result in enhancement of processing capability per unit time as in the case where the devices 41, 42, and 43 are commanded to perform a large amount of predetermined processing, the devices 41, 42, 43, and 44 connected in parallel to the data communications line Cd and the power line AP perform the following control operation. Specifically, by means of taking, as a trigger, an allocation request signal from the data communications line Cd for allocating a processing command to the parallel-connected devices 41, 42, 43, and 44, the switches SW31, SW32, SW33, and SW44 of the other devices 41, 42, 43, and 44 that have not received the processing command are turned on, whereby the devices are activated. As a result, commanded processing is processed by means of the plurality of devices 41, 42, 43, and 44.

When a deficiency in the working current of the devices 41, 42, 43, and 44 having received a parallel processing request is predicted, communication is established as to whether or not the energy assist sections 415 and 435 issued the request can supply power. When power supply is determined to be practicable, the switches of the devices that are deficient in power are turned on, to thus be supplied with additional power, and thus the devices perform commanded processing.

In such a case, when the devices that have received the parallel processing request have a storage battery, transfer of additional power to the devices commanded to perform processing is also conceivable. Thereby, it becomes possible to perform processing by use of power that is greater than the capacity of commercial power.

Various example modifications to the previously-described embodiment are conceivable. For example, a storage battery included in or connected to the device connected to the network is selectively recharged by a host device or a client device through use of power line communication by means of selecting a device having a sufficient margin of power in consideration of conditions, such as an operating status.

When energy input to the device connected to the network is shut off, power is fed from a storage battery in the network to the device that requires power.

Various processing operations described in connection with the embodiment are embodied by an application program which is executed by the information detection sections 111 and 121 by use of working memory of the host devices 11 and 12. This application program is considered to be provided, while remaining installed in a device, to clients (including users) of the host devices 11 and 12 that are computers. In addition to this case, a program to be executed by a computer is provided while remaining stored in a storage medium, or the like, in a computer-readable manner. For instance, a CD-ROM medium, or the like, corresponds to this storage medium, and a program is read and executed by means of a CD-ROM reader (not shown), or the like. These programs are also provided by means of; for example, a program transfer device (not shown), by way of a network and a network interface. This program transfer device has memory which is provided in; for example, the host devices 11 and 12, and stores programs; and program transfer means for providing a program by way of a network.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A power supply system comprising:
   a first device that commands an external device to perform processing, and is configured to supply electric power to the external device;
   a second device that is connected to the first device through a communications line, and that performs the processing in accordance with the command received from the first device; and
   a request unit that requests the first device to supply to the second device an amount of electric power needed for the second device performing the processing commanded by the first device,
   the first device determining whether or not to supply electric power to the second device, in accordance with at least one of; content of the command sent to the second device, and the amount of electric power requested by the request unit and an amount of electric power which the first device is capable of supplying, wherein
   the second device comprises an internal power unit configured to supply electric power, which is different from the electric power to be supplied from the first device, to the second device, and
   the first device commands the second device to use the internal power unit in a case where the amount of electric power required by the request unit exceeds the amount of electric power which the first device is capable of supplying.

2. The power supply system as claimed in claim 1, wherein the first device determines not to supply electric power to the second device in a case where the amount of electric power required by the request unit is within the amount of electric power which the first device is capable of supplying.

3. The power supply system as claimed in claim 1, wherein the first device determines to supply electric power to the second device when the second device is a printing device that performs print processing and the content of the command is the print processing.

4. A power supply system comprising:
   a first device that commands an external device to perform processing, and is configured to supply electric power to the external device;
   a second device that is connected to the first device through a communications line, and that performs processing in accordance with a command received from the first device; and
   a request unit that requests the first device to supply to the second device an amount of electric power needed for the second device performing the processing commanded by the first device,
   the first device determining an amount of electric power supplied to the second device, in accordance with at least one of; content of the command sent to the second device, and the amount of electric power requested by the request unit and an amount of electric power which the first device is capable of supplying, wherein
   the second device comprises an internal power unit configured to supply electric power, which is different from the electric power to be supplied from the first device, to the second device, and
   the first device commands the second device to use the internal power unit in a case where the amount of electric power required by the request unit exceeds the amount of electric power which the first device is capable of supplying.

5. A power supply system comprising:
   a processing device that performs processing in accordance with a command received from an outside;
   a determination unit that determines whether or not to supply electric power to the processing device;
   a request unit that requests the determination unit to supply to the processing device an amount of electric power needed for the processing device performing the processing commanded from the outside; and
   a power feeding unit that is connected to the processing device through a power line, and that supplies electric power to the processing device according to a determination rendered by the determination unit,
   the determination unit determining whether or not to supply the an amount of electric power to the processing device, in accordance with at least one of; the processing commanded by the processing device, and the amount of electric power requested by the request unit and an amount of electric power which the power feeding unit is capable of supplying, wherein
   the processing device comprises an internal power unit configured to supply electric power, which is different from the electric power to be supplied from the power feeding unit, to the processing device, and
   the determination unit determines the processing device is to use the internal power unit in a case where the amount of electric power required by the request unit exceeds the amount of electric power which the first device is capable of supplying.

6. The power supply system as claimed in claim 5, wherein the power feeding unit comprises a storage battery that stores electric power.

7. The power supply system as claimed in claim 5, wherein,
in a case where not supplied with the amount of electric power needed for performing the processing commanded from the outside, the processing device aborts commencement of processing.

8. A power supply system comprising:
a processing device that performs processing in accordance with a command received from an outside;
a determination unit that determines whether or not to supply electric power to the processing device;
a request unit that requests the determination unit to supply to the processing device an amount of electric power needed for the processing device performing the processing commanded from the outside; and
a power feed unit that is connected to the processing device through a power line, and that supplies electric power to the processing device according to a determination rendered by the determination unit,
the determination unit determining an amount of electric power supplied to the processing device, in accordance with at least one of; the processing commanded by the processing device, and the amount of electric power requested by the request unit and an amount of electric power which the first device is capable of supplying, wherein
the processing device comprises an internal power unit configured to supply electric power, which is different from the electric power to be supplied from the power feeding unit, to the processing device, and
the determination unit determines the processing device is to use the internal power unit in a case where the amount of electric power required by the request unit exceeds the amount of electric power which the first device is capable of supplying.

9. The power supply system as claimed in claim 8, wherein the power feed unit is a storage battery which stores electric power.

10. The power supply system as claimed in claim 6, wherein, in a case where not supplied with the amount of electric power needed for performing the processing commanded from the outside, the processing device aborts commencement of processing.

* * * * *